(12) United States Patent
Katieb

(10) Patent No.: US 10,896,404 B2
(45) Date of Patent: *Jan. 19, 2021

(54) COMPUTER READABLE STORAGE MEDIA FOR DYNAMIC SERVICE DEPLOYMENT AND METHODS AND SYSTEMS FOR UTILIZING SAME

(71) Applicant: DOCUMENT STORAGE SYSTEMS, INC., Juno Beach, FL (US)

(72) Inventor: Ralph Katieb, Minneapolis, MN (US)

(73) Assignee: Document Storage Systems, Inc., Juno Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,734

(22) Filed: Aug. 27, 2019

(65) Prior Publication Data

US 2019/0384661 A1 Dec. 19, 2019

Related U.S. Application Data

(63) Continuation of application No. 15/712,087, filed on Sep. 21, 2017, now Pat. No. 10,445,158, which is a
(Continued)

(51) Int. Cl.
*G06Q 10/10* (2012.01)
*H04L 29/08* (2006.01)
(Continued)

(52) U.S. Cl.
CPC .............. *G06Q 10/10* (2013.01); *G06F 9/54* (2013.01); *G06F 9/546* (2013.01); *G06F 9/547* (2013.01);
(Continued)

(58) Field of Classification Search
CPC ........ G06Q 10/10; G06F 16/958; G06F 9/546
See application file for complete search history.

(56) References Cited

U.S. PATENT DOCUMENTS 9,785,490 B2 10/2017 Katieb
2004/0255046 A1 12/2004 Ringseth et al.
(Continued)

FOREIGN PATENT DOCUMENTS

EP 1297451 B1 10/2012
JP 2002183106 A 6/2002
(Continued)

OTHER PUBLICATIONS

Extended European Search Report for European Patent Application No. 15874155.3, dated Aug. 3, 2018 (8 pages).
(Continued)

*Primary Examiner* — Kyung H Shin
(74) *Attorney, Agent, or Firm* — Dorsey & Whitney LLP

(57) ABSTRACT

Systems and methods for service deployment are disclosed herein. Certain implementations may include a memory encoded with computer executable instructions that when executed cause a processing unit to operate a service deployment engine and use consistent APIs both (a) internally via a package API when consuming deployment packages in order to expose them, and (b) externally via a service API when exposing available packages and services to the outside world or enterprise server. By doing so, calling applications can depend on the consistency of the service API engine while the enterprise server itself can reliably consume and interact with a dynamic set of packages organized in a consistent and predictable way. The service deployment engine may be configured to act as a dynamic library loader to interrogate, deploy, start/stop, and/or uninstall packages and services in real time. The packages and services may all implement the same package API.

20 Claims, 5 Drawing Sheets

Related U.S. Application Data continuation of application No. 14/581,417, filed on Dec. 23, 2014, now Pat. No. 9,785,490.

(51) Int. Cl.
*G06F 9/54* (2006.01)
*G06F 16/958* (2019.01)

(52) U.S. Cl.
CPC ............ *G06F 16/958* (2019.01); *H04L 67/02* (2013.01); *H04L 67/16* (2013.01)

(56) References Cited

U.S. PATENT DOCUMENTS

| | | | |
|---|---|---|---|
| 2005/0097566 A1* | 5/2005 | Watts, Jr. | G06F 9/546 719/313 |
| 2007/0255717 A1 | 11/2007 | Baikov et al. | |
| 2007/0255718 A1 | 11/2007 | Baikov et al. | |
| 2008/0059450 A1 | 3/2008 | Joseph et al. | |
| 2008/0082614 A1* | 4/2008 | Bedi | G06Q 10/10 709/206 |
| 2008/0082645 A1* | 4/2008 | Rachitsky | G06F 16/958 709/223 |
| 2009/0144735 A1 | 6/2009 | Kim et al. | |
| 2013/0007773 A1 | 1/2013 | Guilford | |

FOREIGN PATENT DOCUMENTS

| | | |
|---|---|---|
| JP | 2005092423 A | 4/2005 |
| JP | 2005532634 A | 10/2005 |
| JP | 2005346408 A | 12/2005 |
| JP | 2009217410 A | 9/2009 |
| JP | 2013145436 A | 7/2013 |
| JP | 2013542524 A | 11/2013 |
| JP | 2014183587 A | 9/2014 |
| WO | 0195145 A1 | 12/2001 |
| WO | 2016106064 A1 | 6/2016 |

OTHER PUBLICATIONS

International Search Report and Written Opinion of the International Searching Authority for International Patent Application No. PCT/US2015/06303, dated Mar. 29, 2016 (10 pages).

Griffiths, "Binary Search", O'Reilly Japan Co., Ltd., Nov. 2013, 10 pages.

Smith, Chris, "Chapter Instructional Programming", Ohm Corporation, 2010, 7 pages.

\* cited by examiner

COMPUTER READABLE STORAGE MEDIA FOR DYNAMIC SERVICE DEPLOYMENT AND METHODS AND SYSTEMS FOR UTILIZING SAME

CROSS-REFERENCE TO RELATED APPLICATION

This application is a continuation of U.S. patent application Ser. No. 15/712,087, filed Sep. 21, 2017, now issued as U.S. Pat. No. 10,445,158, and entitled "COMPUTER READABLE STORAGE MEDIA FOR DYNAMIC SERVICE DEPLOYMENT AND METHODS AND SYSTEMS FOR UTILIZING SAME," which is a continuation of U.S. patent application Ser. No. 14/581,417, filed Dec. 23, 2014, now issued as U.S. Pat. No. 9,785,490, the entirety of each are hereby incorporated by reference in their entirety and for all purposes.

TECHNICAL FIELD

Embodiments of the present disclosure relate generally to network services, and more specifically to dynamic deployment of network services.

BACKGROUND

In typical enterprise systems, an enterprise server connects to a back-end resource (e.g., an application, data server, or service provider) in response to a request from a client application via a web service. Typically, the web service is published to the enterprise server in such a way that allows clients to treat the service as a remote procedure call rather than as a discrete request to an outside caller. This is done, in part, because most integrated development environments allow developers of client applications to easily embed such services into applications. While easy for the developer, this act introduces hidden hard links between the application and the remote service. The hard links may be described as a kind of contract between the application and the service that is memorialized in a specific description. While this contract may be beneficial in some circumstances, changes to the service or client may invalidate the contract held between the devices and break links. This may result in buggy, incompatible software and a poor user experience, which is problematic in an ever-shifting enterprise landscape. Repairing or updating the hard links may take time and resources and may result in an interruption of services provided by the server. Therefore, there exists a need in the art to provide robust client-server capabilities that reduces the risk of invalidating remote service contracts.

SUMMARY

Certain implementations may include a computer system comprising at least one processing unit coupled to a memory, wherein the memory is encoded with computer executable instructions that when executed cause the at least one processing unit to: receive a client message at a published endpoint, the message formatted according to a first description of a first application programming interface; parse an instruction from the message according to a second description; pass the instruction to a package via a function of the first application programming interface, the package having a second application programming interface and a logic; receive, over the second application programming interface, a result based on the instruction and the logic; and respond to the client message based on the result. The first description may have a substantially generic format, for example, in the form of a jagged string array. In addition, the first application programming interface may be substantially more generic than the second application programming interface. The first and second descriptions are formed from an interface description language (e.g., Web Services Description Language). The client message may be formatted in plain text.

In addition or alternatively, implementations may include a computer hardware system comprising: a processor; a plurality of published endpoints; a memory comprising a package application programming interface; a description of the functionality of a service application programming interface; a service deployment engine, comprising computer executable instructions that when executed cause the processor deploy a plurality of packages to a plurality of endpoints without substantially modifying the description, each package implementing the package application programming interface; a service application programming interface, comprising computer executable instructions that when executed cause the processor to, upon receipt of a client message formatted according to the description at one of the plurality of published endpoints: parse an instruction from the message using the description; and pass the instruction to one of the plurality of packages via the package application programming interface. The service deployment engine may further comprise instructions that when executed cause the processor to detect when a previous version package of the plurality of packages has completed all outstanding operations, prevent the previous version package from accepting new operations, and remove the previous version package. The substantially generic format may be, for example, a jagged string array. The first and second description may be formed from an interface description language, such as Web Services Description Language. The client message may be formatted in plain text.

In addition or alternatively, implementations may include a networked system comprising a plurality of user devices executing client applications and an enterprise server connected to the plurality of client devices via a network. The server may have a processor and a memory comprising a plurality of packages and a set of instructions. Each package may have a service and implement the same package application programming interface. The enterprise server may enable the client applications to access the service through the execution of the set of instructions by the processor. The set of instructions may be computer executable instructions that when executed cause the at least one processor to parse a message from the client application containing arguments formatted according to a generic description of a simple application programming interface and pass the instruction to one of the plurality of packages.

In various implementations and alternatives, a computer hardware system includes at least one processing unit coupled to a memory. The memory is encoded with computer executable instructions that when executed cause the at least one processing unit to: receive a client message at a published endpoint, the message formatted according to a description of a first application programming interface, wherein the description comprises a multi-dimensional array; parse the message; and pass content of the message to a package capable of executing an operation associated with the passed content, where the package comprises a second application programming interface and a logic, the second application programming interface configured to receive a result based on the operation and the logic.

In various implementations and alternatives, a networked system comprises a plurality of user devices executing client applications; and an enterprise server connected to the plurality of client devices via a network, the server having a processor and a memory, where the memory comprises: a plurality of packages; a service deployment engine, comprising computer executable instructions that when executed cause the processor to deploy the plurality of packages to a plurality of endpoints according to a description of a service application programming interface; and a set of instructions, wherein each package has a service and implements a consistent package application programming interface, where the enterprise server enables the client applications to access the service through the execution of the set of instructions by the processor, and where the set of instructions are computer executable instructions that when executed cause the at least one processor to: parse a message from the client application containing arguments formatted according to the description of the service application programming interface; and perform an action comprising one or more of: responding to a client message, detecting whether the client message contains a valid request, or passing the client message to the service via the service application programming interface.

DETAILED DESCRIPTION

Systems and methods for dynamic service deployment are disclosed herein. Certain details are set forth below to provide a sufficient understanding of embodiments of the disclosure. However, embodiments of the disclosure may be practiced without these particular details. Moreover, the particular embodiments are provided by way of example and should not be construed as limiting. In other instances, well-known circuits, control signals, timing protocols, and software operations have not been shown in detail to avoid unnecessarily obscuring the invention.

Disclosed embodiments generally relate to services provided by a server to a client over a network. For example, a user may direct the client to interact with a service to access a server's resources or functionality to produce desired results. Servers are often configured to interact with clients of various hardware and software architectures, which introduces compatibility concerns. As such, servers may define various layers of abstraction in order to achieve greater compatibility with different client architectures. However, if the abstraction layers are too flexible or abstract, the client and server may encounter difficulties ensuring consistent understanding of requests and formatting. As such, mutual definitions and formatting may be beneficial. This may be accomplished through the use of delivery protocols formatted according to an interface description language (IDL) description.

An IDL may be a language or format used to describe functionality offered by a service, such as a web service provided by a server. In particular, the IDL may be used to specify, often via a file containing an IDL description, the manner in which the service may be called, parameters expected by the service, types of responses provided by the service in response to the call (e.g., types of data structures returned), and/or other functionality. The IDL may be its own unique language, a way of formatting or preparing a description in a known or existing language (e.g., Extensible Markup Language (XML)), or a combination thereof. Examples of IDLs include Web Service Description Language (WSDL), Web Application Description Language, and Android™ Interface Definition Language.

In some instances, an IDL description may be used in combination with one or more delivery protocols specifying the manner in which data are exchanged between two or more applications over a network. Each protocol may, for instance, provide a structured messaging framework. These protocols may include but are not limited to simple object access protocol (SOAP) and representational state transfer (REST). In turn, these delivery mechanisms may rely on one or more application layer transport protocols, such as hypertext transport protocol (HTTP) or simple mail transport protocol (SMTP).

Figure 1:
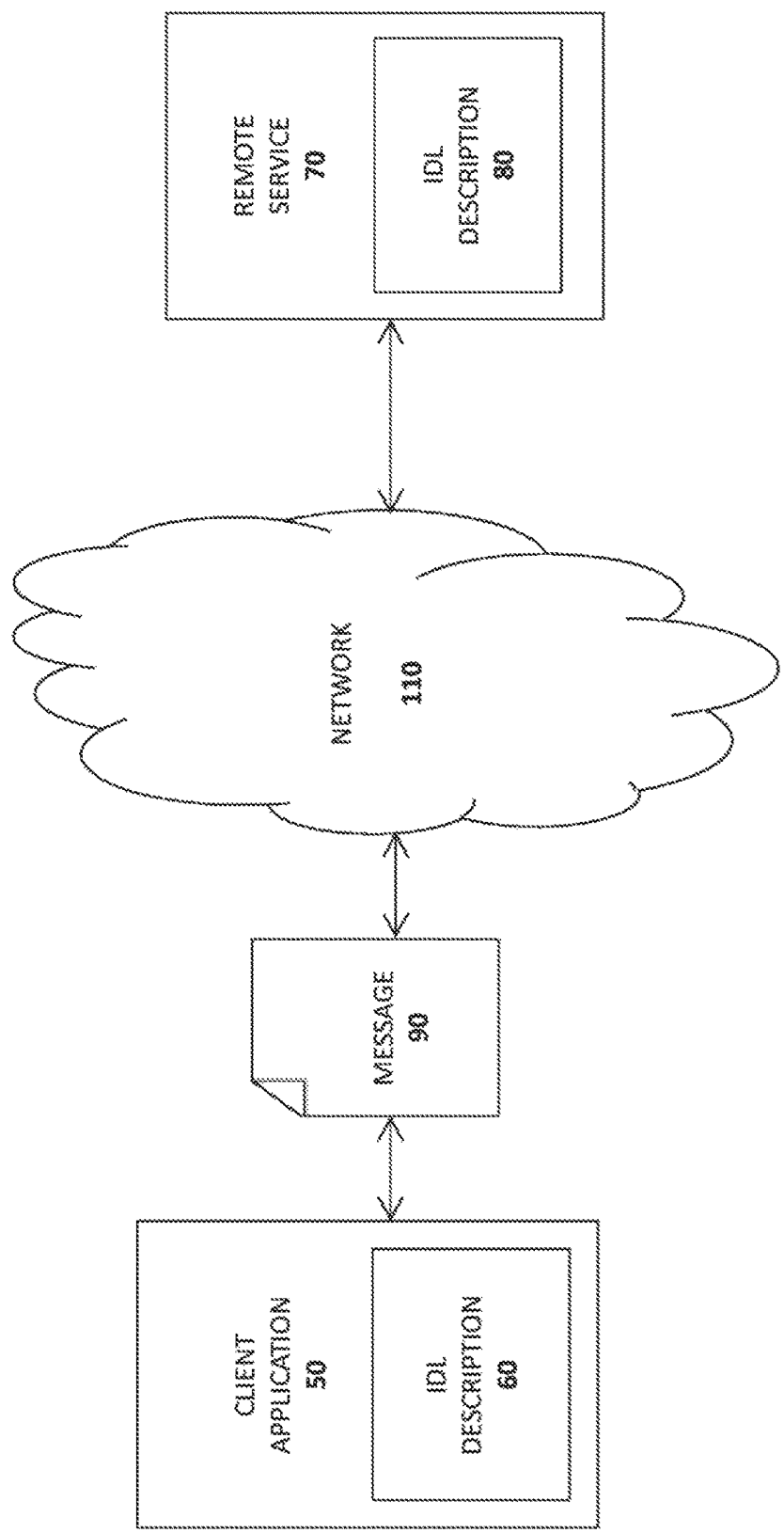
FIG. 1 illustrates a schematic block diagram of certain implementations of a networked client application and a remote service.

FIG. 1 illustrates an embodiment of a system 10, including an application 50 configured to communicate with a remote service 70 over a network 110. As an example, the application 50 may comprise instructions executing on a user computing device and the remote service 70 may comprise instructions executing on an enterprise server. In certain implementations, the application 50 may have three primary functions: provide a user interface to a user, prepare and format messages 90 (e.g., calls) to the remote service 70, and receive and process responses from the remote service 70. The user interface may be a way of providing output to and receiving input from the user. This input and output may be related to requests to and responses from the remote service 70.

In certain implementations, the application 50 may format and provide a message 90 over the network 110 to the remote service 70 according to an IDL description 60 known or accessible to the client application 50. The remote service 70 may include an IDL description 80 that is compatible with the IDL description 60 (e.g., the IDL description 60 and the IDL description 80 are the same). The remote service 70 may receive the message 90 and parse the message 90 according to the protocol and the IDL description 80.

The message 90 may be formatted in various ways. For example, the message 90 may be formatted as plain text. Plain text may be described as a format that lacks significant processing or formatting. For example, plain text may be encoded according to ASCII, UTF-8, or the like. Plain text does not require interpreting as binary objects as would be done with, for example, images and encoded numbers.

Depending on the contents of the message 90, the remote service 70 may take a certain action, including but not limited to accessing particular resources, performing a process, and preparing a response to the client application 50 according to an agreed upon format. In this manner, the application 50 and the remote service 70 may operate in accordance with a remote service contract defined by the complimentary IDL descriptions 60, 80.

In some instances, however, the remote service 70 or client application 50 may be modified (e.g., upgraded). If the IDL descriptions 60, 80 were formatted in a particularly specific manner, then the IDL descriptions 60, 80 may no longer accurately describe the services offered. As a result, the contract between the application 50 and the remote service 70 may be invalidated because the application 50 and service 70 may be unable to format and parse messages 90 according to compatible IDL descriptions 60, 80. The incompatibility may result in the application 50 no longer providing valid requests to the remote service 70 and receiving valid responses. The communication according to the incompatible IDL descriptions 60, 80 may result in erroneous data, application instability, or other problems. However, generic IDL descriptions 60, 80 may be implemented such that contracts may remain intact despite modifications and/or upgrades to the underlying service. The IDL descriptions 60, 80 may be written in a generic format to serve as an entry point for various services. Certain implementations of the generic format may include the use of data structures including but not limited to a multidimensional array of strings.

Figure 2:
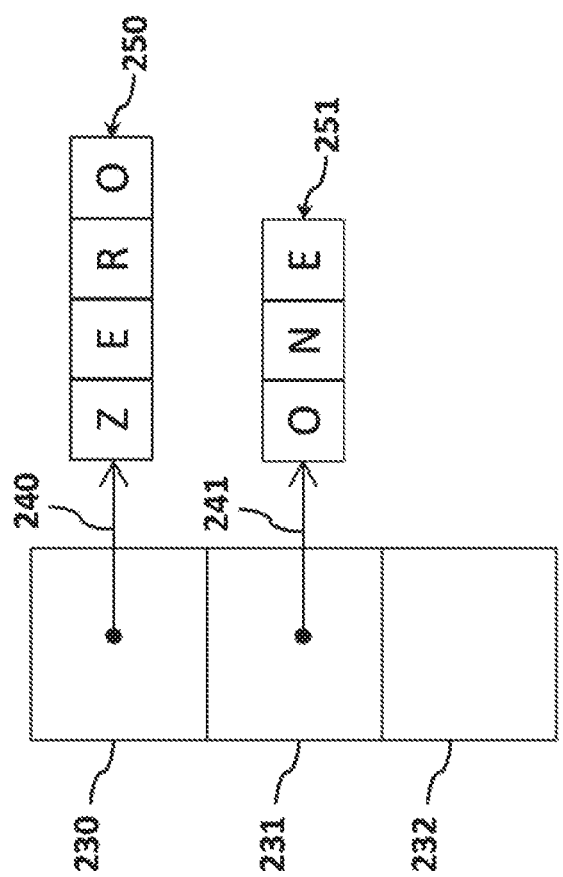
FIG. 2 illustrates certain implementations of a generic format in the form of a multi-dimensional array.

FIG. 2 illustrates certain implementations of a generic format in the form of a multi-dimensional array 210. The multi-dimensional array 210 includes elements 230, 231, 232 which may contain references 240, 241 to other arrays 250, 251. The other arrays 250, 251 may also themselves define elements. These elements may comprise references to yet other data structures or data. In the certain illustrated implementations, the other arrays 250, 251 may contain character data, making the multi-dimensional array 210 a jagged string array. The element 232 does not contain a reference to another array and may be described as having a null reference. The multi-dimensional array may have various qualities including but not limited to: having a fixed length, having a variable length, cast to a particular type (e.g. a string), and other attributes typically found in multi-dimensional arrays.

Figure 3:
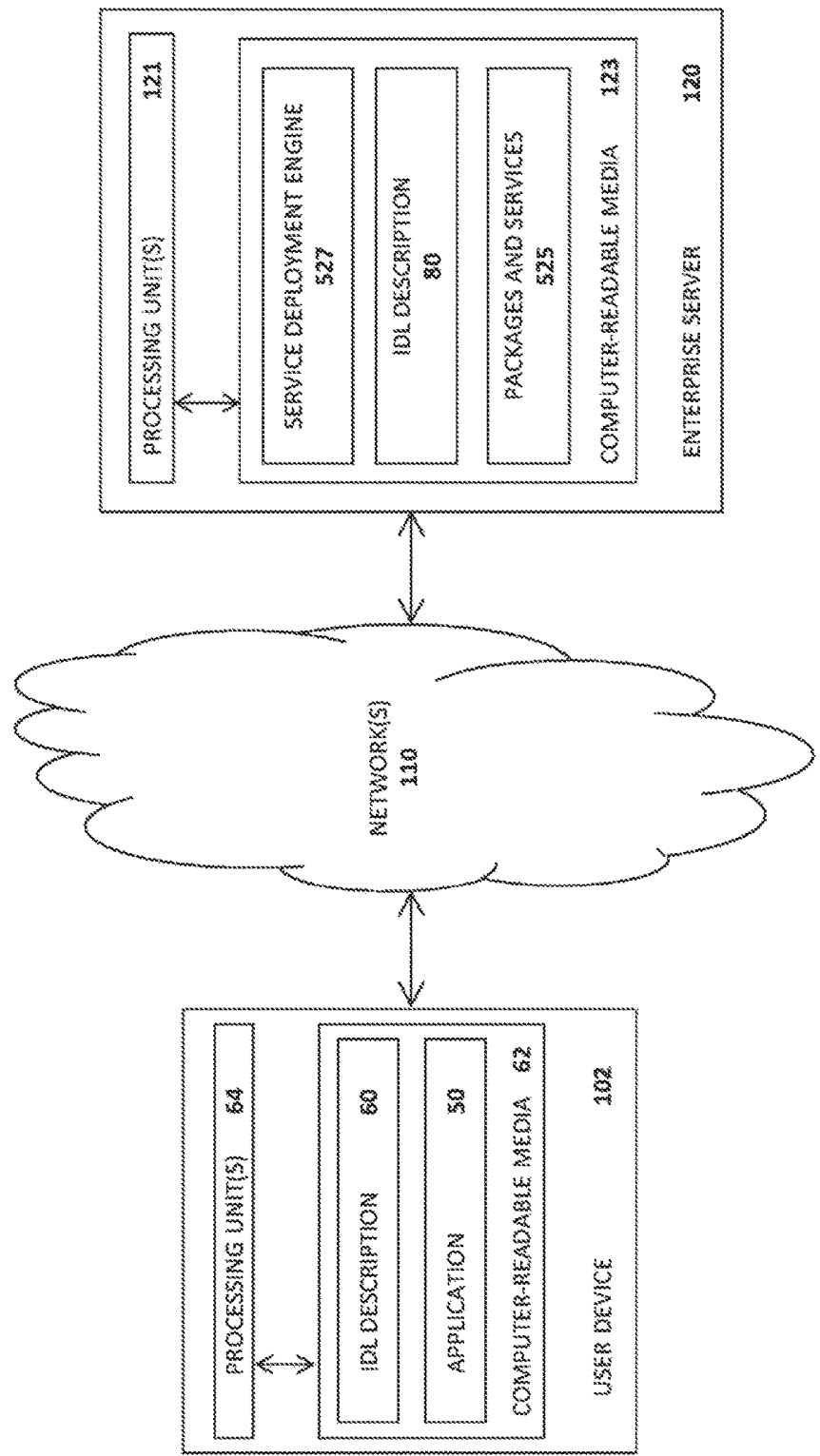
FIG. 3 illustrates a schematic block diagram of certain implementations of a computer networking environment.

FIG. 3 illustrates a schematic diagram of certain implementations of a computer networking environment 100, including a user device 102, the network 110, and an enterprise server 120. The user device 102 may comprise a computing device, including but not limited to a modem, a router, a gateway, a server, a thin client, a laptop, a desktop, a computer, a tablet, a media device, a smart phone, a television, a phablet, a cellular phone or other mobile device, or any combination or sub-combination of the same. The user device 102 may include a computer-readable media 62 encoded with executable instructions that may operate in conjunction with one or more processing units 64 of the user device 102 to provide functionality allowing execution of an application 50. The computer-readable media 62 may also include the IDL description 60. The application 50 may be an application, such as an executable program, that may interface with one or more services provided by the enterprise server 120. The user device 102 may be configured to communicate over a network 110 with any number of devices, including but not limited to the enterprise server 120.

The network 110 may comprise one or more networks, such as local area networks (LANs), wide area networks (WANs), metropolitan area networks (MANs), cellular networks, and/or the Internet. Communications provided to, from, and within the network 110 may wired and/or wireless, and further may be provided by any networking devices known in the art, now or in the future. Devices communicating over the network 110 may communicate with a communication protocol, such as Transmission Control Protocol/Internet Protocol (TCP/IP) or User Datagram Protocol (UDP). Additionally, the user device 102 and the enterprise server 120 may be configured to communicate using known protocols such as Hypertext Transfer Protocol (HTTP), Hypertext Transfer Protocol Secure (HTTPS), Secure Sockets Layer (SSL), server-resident protocols, or other protocols. Server-resident protocols may include named pipes, shared memory, and other protocols. Such protocols may also be used to share information between an application server (e.g., a server that manages, runs back end processes, or hosts an application) and the enterprise server 120 in the same physical unit.

The enterprise server 120 may include one or more processing units 121 operably coupled to one or more computer readable media 123. Computer readable media 123 may include any form of computer readable storage or computer readable memory, transitory or non-transitory, including but not limited to, externally or internally attached hard disk drives, solid-state storage (such as NAND flash or NOR flash media), tiered storage solutions, storage area networks, network attached storage, and/or optical storage.

The computer readable media 123 may store various modules, including but not limited to executable instructions for operating a service deployment engine 527, the IDL description 80, and a plurality of packages and services 525. As described, the instructions stored on the computer readable media 123 may be executed on the one or more processing units 121 or other processing units.

The executable instructions for operating the service deployment engine 527 may include instructions that, when executed on a processing unit 121, enable the operation of the service deployment 527 on the enterprise server 120 to act as a dynamic library loader to interrogate, deploy, start/stop, and/or uninstall packages and services 525 in real time, further examples of which are provided below. Although the executable instructions for the service deployment engine 527 are shown on a same computer readable media 123, in some embodiments any or all sets of instructions may be provided on multiple computer readable media and may not be resident on the same media.

Figure 4:
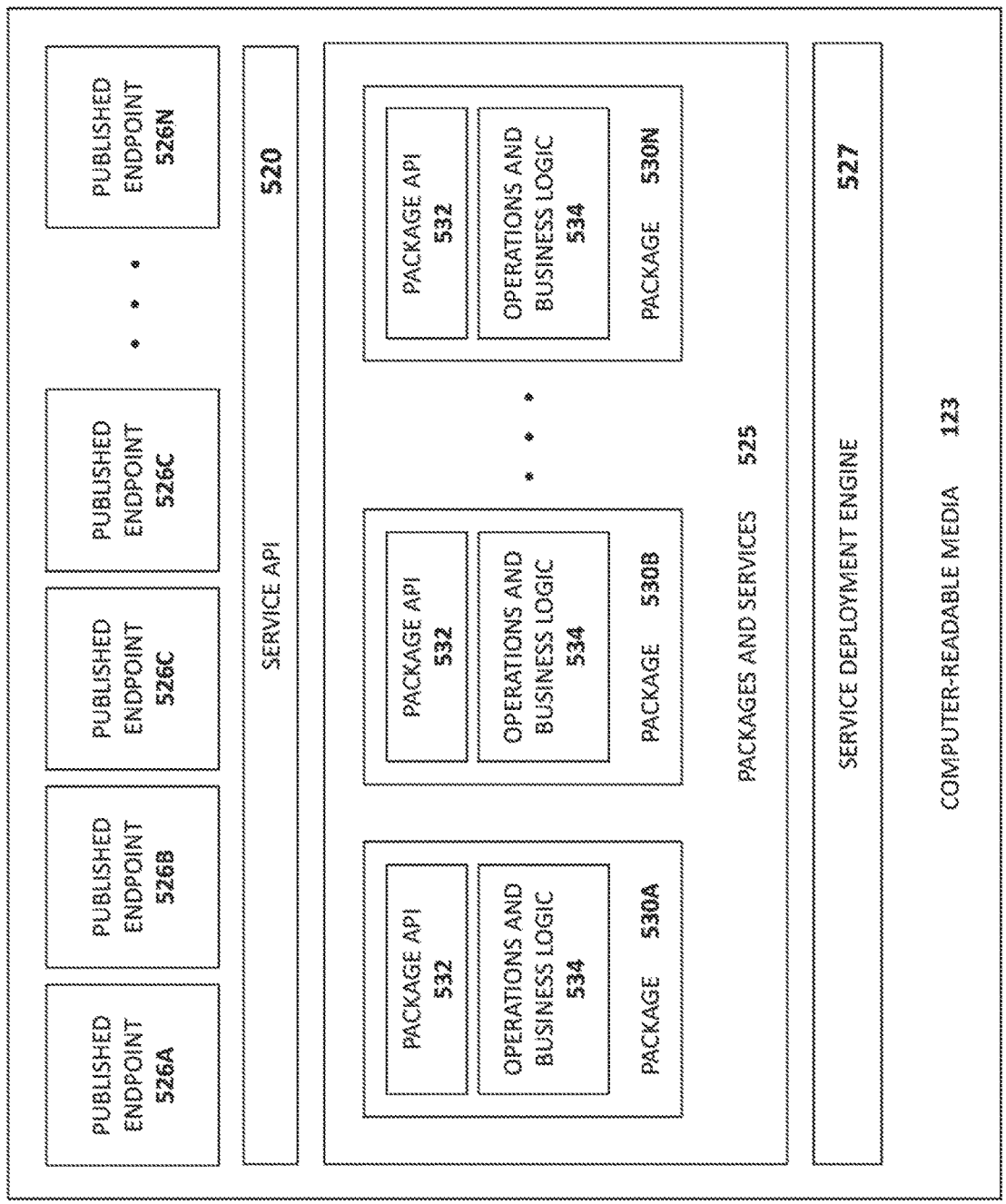
FIG. 4 illustrates a schematic block diagram of particular modules located on a computer readable media according to certain implementations.

The packages and services 525 may be one or more software components and resources that have been packaged together in order to provide particular functionality or services when executed on the processing unit 121 of the enterprise server 120. With reference to FIG. 4, packages and services 525 may comprise a plurality of individual packages 530 (e.g., 530A through 530N). The packages 530 may be organized according to package self-assigned version numbers, and allow multiple versions of the same package to exist simultaneously. For large enterprises especially, this built-in versioning functionality enables scaling into a new version of a critical package 530 rather than requiring a cut-over approach, the latter often being fraught with hidden traps and the dangers of service interruptions. Allowing multiple versions of the same package 530 to exist simultaneously, enables the two versions to exist and be used simultaneously on the enterprise server 120 by different user devices 102.

With continuing reference to FIG. 4, this figure illustrates a detailed view of particular modules located on the computer readable media 123, and includes a service application programming interface (API) 520, packages and services 525, publishing endpoints 526 (e.g., 526A through 526N) and a service deployment engine 527.

The publishing endpoints 526 may be locations (e.g. a port, Uniform Resource Identifier (URI) such as a Uniform Resource Link (URL), named tokens, a named pipe, a block of shared memory, or other locations) exposed by the enterprise server 120 where the client application may access a function (e.g. an API) implemented by the enterprise server 120. Different types of communication may be enabled over different endpoints. For example, there may be a TCP/IP endpoint, a SOAP endpoint, etc. During calls to various services, a specific type of endpoint 526 (e.g., Windows™ Communication Foundation (WCF), JavaScript Object Notation (JSON), SOAP, REST, TCP/IP, named pipes) may be chosen by the communication capabilities of application 50 sending the message 90. The enterprise server 120 may publish its own IDL description 80 on all publishing endpoints 526 concurrently, and publish live changes (i.e. zero-downtime) out to all of these concurrently as well. This means that when a package 530 is deployed into the enterprise server 120, it is simultaneously and instantaneously available and reachable via any and all of the desired endpoints 526.

The service API 520 may be a simple interface that enables a set of basic functions (e.g. create, read, update, delete, and invoke) to be performed. The IDL description 80 may describe the functionality of the service API 520. For example, the IDL descriptions 60, 80 may describe a generic "InvokeOp" function that allows a client application 50 to send a message 90 that instructs the enterprise server 120 to execute a specific function according to an addressing scheme. For example: "InvokeOp("company.package[20].operation")", which may execute operation "operation" from version 2.0 of the package "package" from company "company". The enterprise server 120 may be configured such that if the caller would instead like the latest version, they simply need to request version [*] (i.e. wildcard version), which always resolves internally in the enterprise server 120 to the latest version of the package installed. The enterprise server 120 may be configured such that if no version is specified, to assume that the application 50 would simply like the latest or highest-versioned package to perform the requested operation.

The service API 520 may expose the same IDL description 80 to all client applications 50 and implement operation dynamism as a function of the enterprise server 120 itself. This structure enables the client application 50 and the enterprise server 120 to keep the contractual agreement made between the IDL descriptions 60, 80. The enterprise server 120 may expose a simple IDL description with a simple entry point (e.g. only a single entry point) into the published packages and services 525 that utilizes a generic format (e.g. an array-of-arrays or a jagged string array described in connection with FIG. 2) in order to guarantee that the communication mechanism between the client application 50 and the enterprise server 120 will not change in such a way as to invalidate the IDL description contract between the enterprise server 120 and the client application 50. Client applications 50 that are dependent on the IDL description 80 remaining consistent across multiple messages can do so and will not be affected by the deploy/undeploy operations taking place beneath the surface exposed to the enterprise server 120 itself.

Figures 5, 6:
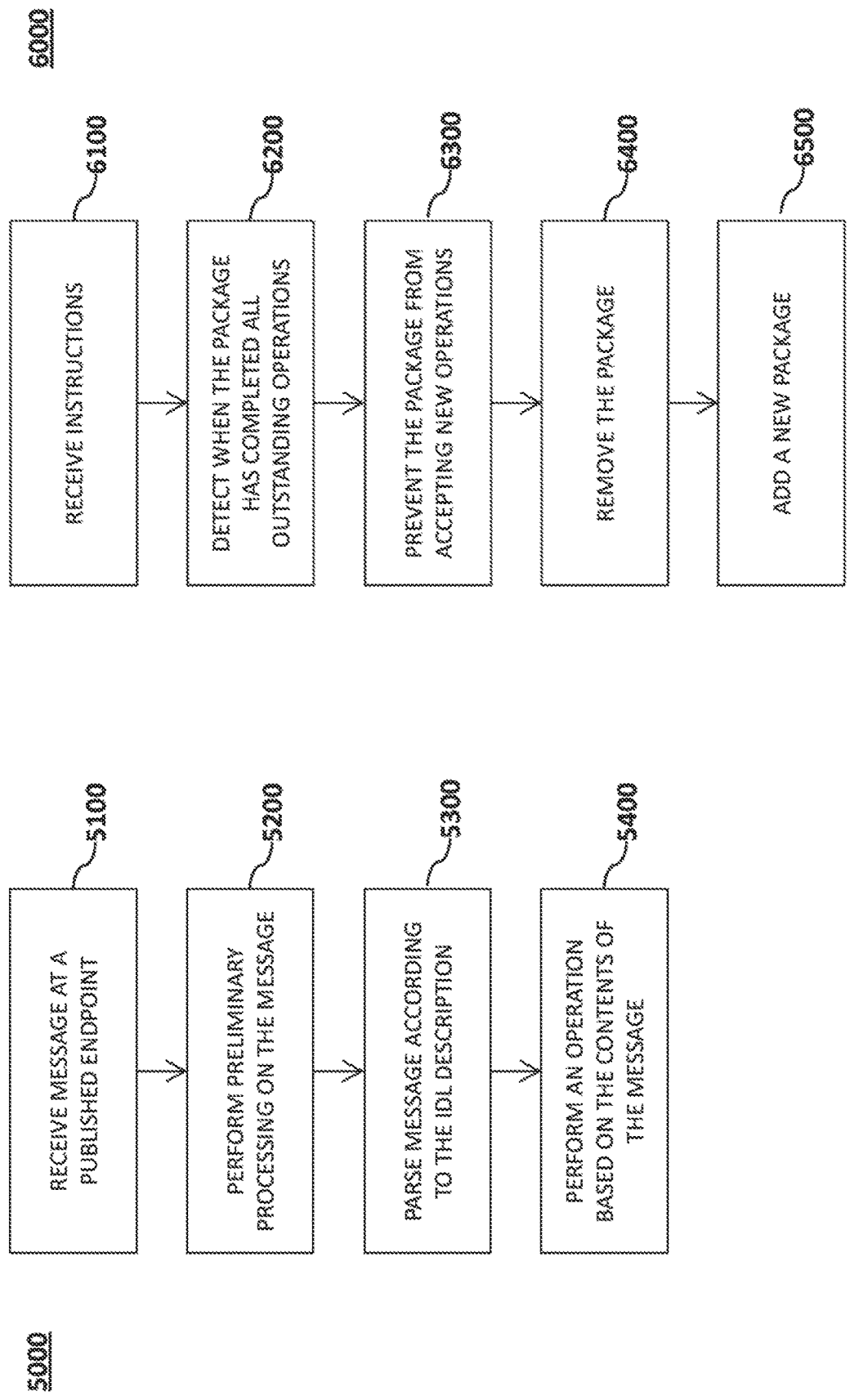
FIG. 5 is a flowchart of a method for processing requests according to certain implementations.
FIG. 6 is a flowchart of a method for acting on a package according to certain implementations.

FIG. 5 illustrates a flowchart of a method 5000 for processing messages 90 according to certain implementations. At step 5100, the enterprise server 120 receives a message at a published endpoint 526. Next, at step 5200, preliminary processing may be performed on the message. This step 5200 may include handling networking tasks associated with receiving the message 90, including waiting for additional packets, performing error correction on the packet, preliminary packet parsing, and other processes. Additionally, the enterprise server 120 may perform authentication steps such as ensuring that the message is from an authenticated user, or ensuring that the calling application 50 is using a legitimate session identifier to identify itself or the user. Next, at step 5300, the message 90 is parsed according to the IDL description 80. After parsing the message 90, at step 5400, the enterprise server 120 performs an operation based on the contents of the message 90, including but not limited to passing the message 90 to a package 530, passing a particular content of the message 90 to a particular package 530, responding to the message 90 without passing the contents to a package 530, and detecting whether the message 90 contains a valid request (e.g., testing whether the contents are directed to a valid package). In certain implementations, message passing may be performed according to a package API 532 implemented by the particular package 530. Additionally, according to certain implementations, once the service API 520 receives the call, the service API 520 performs no conversion on the calling request object. This process may decrease latency between receiving a message and acting on it.

Returning to FIG. 4, the enterprise server 120 may use its own addressing nomenclature in order to provide access to individual packages 530 and their operations 534 without having to change the IDL description 80. The IDL description 80 may describe or expose a generic method for invoking an operation. The arguments may change in order to specify parameters. The syntax may be extended in order to support versioned and/or unversioned calls. Certain implementations may do so without adding additional parameters to the IDL. Instead, the certain implementations may define the operation to allow specific versions to be embedded in the addressing nomenclature itself, for example, by including the desired version number in the addressing nomenclature itself.

This approach to IDL-independent version calling presents several advantages. For example, the user device 102 may be programmed to request the highest version number and test the result for accuracy or errors. If the result contains an error, then the client may request a series of incrementally lower version numbers until it receives an accurate/error-free result or it runs out of version numbers to call. This may be useful if, for example, an undiscovered error is present in a newer version of the package. In addition, this system could be used to configure the client application to utilize functions from across different versions of the operation. For example, a user may prefer some features found in one version (e.g. version 1.0) of an application, but prefers other features found in another version (e.g. version 2.0). The user or the application may specify to utilize version 1.0 for some features and to utilize version 2.0 for all other features. In addition, the separate nature of the packages enables a particular version to be recalled or discontinued as many times as needed without interrupting users of different versions.

Additionally, a custom solution could be created that wraps other services in a master service and requires that all calling applications use this wrapper service instead of depending on breakable linkages to the individual services themselves. However, this approach may introduce overhead since the master service may be unlikely to insulate current callers from dependent-service interruptions. It may also be time-intensive because the link between the wrapper/master service and its dependencies introduces a web of connection-to-connection calls that may increase the load on the network between the wrapper and wrapped services.

With continued reference to FIG. 4, in certain implementations, each package 530 may implement a package API 532 and an operations and business logic 534. The package API 532 is the particular interface through which the package 530 and the enterprise server 120 communicate, which may include providing access to the underlying operations and business logic 534 of the package 530. The package API 532 and the operations and business logic 534 may also enable the enterprise server 120 to provide the remote service 70. As such, the enterprise server 120 may be configured to pass parsed arguments from the message 90 via the package API 532 to the operations and business logic 534.

In certain implementations, the enterprise server 120 may simultaneously deploy any package and any operation across any publishing endpoint 526 capable of interacting with a generic format (e.g. a simple string-of-strings) calling pattern. This may be accomplished, for example, by exposing a consistent and simple service API 520 externally and leveraging a consistent package API 532 internally that package developers must use in order to deploy to the enterprise server 120. The consistent package API 532 allows exposure to client applications 50 using various protocols to communicate with the enterprise server 120.

This functionality may be achieved by, for example, utilizing consistent package APIs 532 internally to the enterprise server 120 in order to install business logic 534 as a recognized package 530 on the enterprise server 120. The package API 532 may provide the internally-consistent abstraction layer that allows the enterprise server 120 to dynamically adjust and respond to various service requests without allowing those changes to be seen or felt by a calling application 50. Specifically, packages 530 may be deployed and undeployed without having to alter the IDL description 80. The abstraction provided by the service API 520 may be substantially broader, more generic, and/or more flexible than the package API 532 such that the IDL description 80 may remain consistent despite changes to the packages and services 525 (e.g., a package 530 being deployed, redeployed, or undeployed). This arrangement may enable the package API 532 to operate independently of the IDL description 80 by insulating the "what to do" described by the IDL description 80 from the "how it is being done" of the package API 532 and other underlying functionality. In certain implementations, the package API 532 enables a fixed contract on a binary level without the risk of breaking links by implementing a dynamic registration concept that parallels IDL description functionality (e.g. operation lookup functionality, operation invocation, and other functions).

Because the system 100 utilizes a consistent internal package API 532 and does not expose these packages 530 outright to calling client applications 50 (e.g., without the abstraction provided by the service API 520), the system 100 is able to expose the operations and services provided by the package 530 through many client routes simultaneously. For example, an installed package 530 with operations 534 may be automatically and simultaneously published and made available to the enterprise via a plurality of endpoints 526, such as WCF, SOAP, JSON, REST, named pipes, TCP/IP, and others. Since the enterprise server 120 and packages 532 both use the same proprietary and well-known package API 532 (the server 120 consuming or expecting it and the package developer consuming or implementing it), the packages 530 may act as dynamic real-time extensions to the enterprise server 120 itself. The installed packages 530 may also be published and made available to other packages 530.

This wide-publish functionality may be provided without the package developer having to perform extra steps, request it, or write any additional/different code.

Certain embodiments may enable a consistent package API 532 by having the enterprise server 120 itself publish and consume a low-level "abstract interface" in the form of a library (e.g., a Dynamic Link Library (DLL)). The binary image of that abstract class may be located in the same directory on the enterprise server 120 as the server executable itself, as well as an identical version of that interface library being published to package developers via a package interface software development kit. By linking their respective projects directly to the package interface library and instantiating the abstract classes therein, the enterprise server 120 can detect what a package developer's package (binary image) will contain when it arrives in an internal directory for deployment.

In addition, the enterprise server 120 may verify that the developer of the package 530 implemented all required abstract class methods by querying the library for validity and completeness (e.g., using Microsoft™ .NET introspection to query a DLL) prior to linking with it and loading/deploying it as a live package on the enterprise server 120. While a developer would be hard-pressed to try to create or build an incomplete library using the standard developer tools, a developer could potentially construct a partial/fragmented library with non-standard developer tools. In certain implementations, querying for validity may be combined with internal (e.g. within the same enterprise server) binary hard-links to published or expected library class interface implementations. This may aid the package API 532 to enable the enterprise server 120 to publish a package 530 and simultaneously provide the package 530 with myriad services (e.g. single sign on, enterprise metadata dictionaries, Health Level-7 integration points, and other services).

In certain implementations, the service API 520 may perform a look-up of the options available and return them to a calling application 50. This may be performed through a dynamic IDL function. The look-up may give a real-time update as to what packages and services 525 are installed or available to the application 50. For example, the application 50 may request the packages and services 525 available, and the service API 520 may return a list of options based on a dot-notation to specify the programming level for which the user or calling application 50 wants to know what options are available. As an example, a user may be running a 1.1 version of software of which versions 1.0, 1.1, and 2.0 are available on the server. The user may request the available operations relating to a 1.1 version and receive a list of the publishing endpoints available to the 1.1 version of the software.

An alternate way of implementing this approach would be to allow applications 50 to index or interrogate a dynamic list of services available on any given enterprise server 120 and then consume those services ad-hoc. This type of functionality is achievable through, for example, a directory listing of available binary extensions (e.g. PHP: Hypertext Preprocessor (PHP) executables) or using XML, and Universal Description, Discovery and Integration (UDDI). The deployment of these services may be one-dimensional and only available on the enterprise server 120 and protocol of original deployment.

In addition, certain implementations of the service deployment engine 527 may isolate and integrate all packages 530 dynamically in order to expose their operations (e.g. SOAP-invoked business logic) to clients in an orderly manner without affecting the delivery of other services or operations currently in progress. This isolation may be accomplished by providing a predetermined, controlled set of resources (e.g., memory, processor cycles, etc.) to the package 530 in order to prevent or limit damage in case the packages crashes. In addition, this isolation enables the package 530 to be executed without substantially interfering or substantially being affected by other operations occurring on the enterprise server 120. In certain implementations, the service deployment engine 527 may also wrap the individual packages in a robust in-process exception and/or error scope to ensure that no package has the capability of crashing the server. In addition, packages may be monitored by the enterprise server 120 to ensure that resource-hungry processes are throttled to allow all concurrently-executing processes to have proper resources to complete their functions.

FIG. 6 illustrates a flowchart of a method 6000 for undeploying or redeploying a package 530 according to certain implementations. First, at step 6100, the service deployment engine 527 may receive an instruction to perform a particular operation on a package 530. This instruction may be received from various sources. The instruction may be transmitted over one of the published endpoints 526 and be processed according to, for example, the method of FIG. 5. In certain embodiments, the instruction may be received from a user interacting directly with the enterprise server 120 over, for example, a terminal or workstation attached to the enterprise server. The instructions may describe a particular method to be performed on a specific package 530, which may include an undeploy or overwrite command.

At step 6200, the service deployment engine 527 may monitor the specific package 530 to detect whether the package 530 has completed all outstanding operations. Acting on a currently operating package 530 (e.g. removing the package 530) may cause instability for the client application 50 or a loss of data. This detection may be performed by, for example, monitoring the resource usage of the package 530 or monitoring an active process list.

At step 6300, the package 530 may be prevented from accepting new operations. This step may include certain substeps, including but not limited to preventing the package 530 from using any resources, making the package 530 invisible to additional requests, changing a permission level of the package 530, and locking the package 530.

At step 6400, the package may be removed. This step 6400 may include deleting the package 530 entirely. However, in certain implementations, the package 530 may remain stored on the computer readable media 123 but remain in a substantially unusable state, for example, as a result of performing one of the certain substeps of step 6300.

At step 6500, depending on the instructions received, a new package 530 may need to be added or deployed. This may include the substeps of verifying the validity of the package, publishing the package to endpoints 526, installing the package 530, and other such substeps.

The described method may be utilized to perform dynamic deployment that respects the versioning of the packages and services 525. For example, if the method is used to redeploy version 3 of a particular package, then the previous version 3 finishes its calls and is gracefully replaced with a new version 3 of the particular package.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A networked system comprising:
a plurality of user devices executing client applications; and
an enterprise server connected to the plurality of client devices via a network, the server having a processor and a memory, wherein the memory comprises:
a plurality of packages comprising a plurality aversion packages, each version package capable of being used simultaneously on the enterprise server by different user devices;
a service deployment engine, comprising computer executable instructions that when executed cause the processor to deploy the plurality of packages to a plurality of endpoints according to a description of a service application programming interface; and
a set of instructions,
wherein each package has a service and implements a consistent package application programming interface,
wherein the enterprise server enables the client applications to access the service through the execution of the set of instructions by the processor, and
wherein the set of instructions are computer executable instructions that when executed cause the at least one processor to:
parse a message from the client application containing arguments formatted according to the description of the service application programming interface; and
perform a requested operation from one of the plurality of version packages.

2. The system of claim 1, wherein the service deployment engine further comprises instructions that when executed cause the processor to:
detect when a version package of the plurality of packages has completed all outstanding operations; and
prevent the version package from accepting new operations.

3. The system of claim 2, wherein the processor prevents the version package from accepting new operations by one or more of: preventing the version package from using resources, making the version package invisible to additional requests, changing a permission level of the version package, or locking the version package.

4. The system of claim 1, wherein the service deployment engine further comprises instructions that when executed cause the processor to:
detect when a version package of the plurality of packages has completed all outstanding operations; and
remove the version package.

5. The system of claim 4, wherein the processor removes the version package by one or more of: deleting the version package or storing the version package in an unusable state.

6. The system of claim 4, wherein the processor installs a new version package.

7. The system of claim 6, wherein the processor installs the new version package by one or more of: verifying the version package is valid or publishing the version package to endpoints.

8. The system of claim 1, wherein the processor installs a new version package.

9. The system of claim 8, wherein the processor installs the new version package by one or more of: verifying the version package is valid or publishing the version package to endpoints.

10. The system of claim 1, wherein the server is configured to cause a highest-versioned package to perform the requested operation where no version is specified.

11. The system of claim 1, wherein the server is configured to perform the requested operation from a series of incrementally lower versions in response to client requests.

12. The system of claim 1, wherein the server is configured to perform the requested operation from a first version package of the plurality of packages and perform a further requested operation from a second version package of the plurality of packages.

13. The system of claim 1, wherein the service deployment engine further comprises instructions that when executed cause the processor to:
   recall or discontinue a version package of the plurality of packages; and
   perform the requested operation from one of the other of the plurality of packages.

14. The system of claim 1, wherein the description comprises a jagged string array.

15. A computer hardware system comprising:
   a processor;
   a plurality of published endpoints;
   a memory comprising:
      a plurality of packages implementing a package application programming interface, the plurality of packages comprising a plurality of version packages, each version package capable of being used simultaneously by different user devices;
      a description of the functionality of a service application programming interface; and
      a service deployment engine, comprising computer executable instructions that when executed cause the processor to deploy the plurality of packages to a plurality of endpoints according to the description of the functionality of the service application programming interface,
   wherein the service application programming interface comprises computer executable instructions that when executed cause the processor to, upon receipt of a client message formatted according to the description at one of the plurality of published endpoints:
      parse an instruction from the message using the description; and
      perform a requested operation from one of the plurality of version packages.

16. The system of claim 15, wherein the service deployment engine further comprises instructions that when executed cause the processor to:
   detect when a version package of the plurality of packages has completed all outstanding operations; and
   prevent the version package from accepting new operations.

17. The system of claim 15, wherein the processor prevents the version package from accepting new operations by one or more of: preventing the version package from using resources, making the version package invisible to additional requests, changing a permission level of the version package, or locking the version package.

18. The system of claim 15, wherein the service deployment engine further comprises instructions that when executed cause the processor to:
   detect when a version package of the plurality of packages has completed all outstanding operations; and
   remove the version package.

19. The system of claim 15, wherein the service deployment engine further comprises instructions that when executed cause the processor to:
   recall or discontinue a version package of the plurality of packages; and
   perform the requested operation from one of the other of the plurality of packages.

20. A networked system comprising:
   a plurality of user devices executing client applications; and
   an enterprise server connected to the plurality of client devices via a network, the server having a processor and a memory, wherein the memory comprises:
      a plurality of packages comprising a plurality of version packages, each version package capable of being used simultaneously on the enterprise server by different user devices;
      a service deployment engine, comprising computer executable instructions that when executed cause the processor to deploy the plurality of packages to a plurality of endpoints according to a description of a service application programming interface; and
      a set of instructions,
   wherein each package has a service and implements a consistent package application programming interface,
   wherein the server uses its own addressing nomenclature to provide access to the plurality of packages, and
   wherein the set of instructions are computer executable instructions that when executed cause the at least one processor to:
      parse a message from the client application containing arguments formatted according to the description of the service application programming interface; and
      perform a requested operation from one of the plurality of version packages.

* * * * *

UNITED STATES PATENT AND TRADEMARK OFFICE
CERTIFICATE OF CORRECTION

PATENT NO. : 10,896,404 B2  
APPLICATION NO. : 16/552734  
DATED : January 19, 2021  
INVENTOR(S) : Ralph Katieb Page 1 of 1

It is certified that error appears in the above-identified patent and that said Letters Patent is hereby corrected as shown below:

In the Claims

In Column 12, Claim 1, Line 11 delete ""aversion"" replace with --of version--

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*